(12) United States Patent
Liu et al.

(10) Patent No.: US 10,819,905 B1
(45) Date of Patent: Oct. 27, 2020

(54) SYSTEM AND METHOD FOR TEMPERATURE SENSING IN COOKING APPLIANCE WITH DATA FUSION

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Qiang Liu, Cupertino, CA (US); Xin Yan, San Jose, CA (US)

(73) Assignees: GUANGDONG MEDIA KITCHEN APPLIANCE MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 16/570,997

(22) Filed: Sep. 13, 2019

(51) Int. Cl.
| | |
|---|---|
| H04N 5/232 | (2006.01) |
| H04N 5/247 | (2006.01) |
| G06T 7/12 | (2017.01) |
| G06T 7/80 | (2017.01) |
| G01J 5/10 | (2006.01) |
| G01J 5/00 | (2006.01) |
| H04N 5/33 | (2006.01) |

(52) U.S. Cl.
CPC ........ H04N 5/23229 (2013.01); G01J 5/0044 (2013.01); G01J 5/10 (2013.01); G06T 7/12 (2017.01); G06T 7/80 (2017.01); H04N 5/247 (2013.01); *G01J 2005/0077* (2013.01); *G01J 2005/106* (2013.01); *G06T 2207/10024* (2013.01); *G06T 2207/10048* (2013.01)

(58) Field of Classification Search
CPC .... G06T 7/12; G06T 7/70; G06T 7/80; G06T 2207/10024; G06T 2207/10048; G01J 5/0044; G01J 5/10; G01J 2005/0077; G01J 2005/0081; G01J 2005/106; H04N 5/2329; H04N 5/247; H05B 6/6435; H05B 6/645; H05B 6/6455; H05B 6/68
See application file for complete search history.

(56) References Cited

U.S. PATENT DOCUMENTS

| | | | |
|---|---|---|---|
| 8,565,547 B2 * | 10/2013 | Strandemar .......... | G06K 9/6289 382/263 |
| 9,453,657 B2 * | 9/2016 | Silawan .................. | G01J 5/047 |
| 9,606,004 B2 * | 3/2017 | Hwang .................... | H05B 6/64 |
| 10,228,145 B2 * | 3/2019 | Erbe ........................ | F24C 7/081 |
| 10,455,518 B2 * | 10/2019 | Fontana ............... | H04W 52/245 |

(Continued)

*Primary Examiner* — Brian P Yenke
(74) *Attorney, Agent, or Firm* — Morgan, Lewis & Bockius LLP

(57) ABSTRACT

A cooking chamber includes thermal camera of a lower resolution and a color camera of a higher resolution. The two cameras capture images at the same time to obtain a thermal image and a color image. The thermal image is processed to correlate respective subsets of its pixels to corresponding subsets of pixels in the color image for one or more food items identified in the in accordance with established calibration rules, establishing correlations between pixels of the second image to respective sets of pixels corresponding to the one or more food items identified in the two images, where the established calibration rules associate the perspectives and resolutions of the two cameras. A temperature map is generated for the one or more food items with the second resolution in accordance with the established correlations.

17 Claims, 11 Drawing Sheets

(56) References Cited

U.S. PATENT DOCUMENTS

| | | | | |
|---|---|---|---|---|
| 2010/0182136 | A1* | 7/2010 | Pryor | F24C 7/082 |
| | | | | 340/425.5 |
| 2010/0284591 | A1* | 11/2010 | Arnon | A61B 5/015 |
| | | | | 382/128 |
| 2013/0306627 | A1* | 11/2013 | Libman | H05B 6/705 |
| | | | | 219/705 |
| 2014/0044340 | A1* | 2/2014 | Phan | G01J 5/20 |
| | | | | 382/154 |
| 2015/0289324 | A1* | 10/2015 | Rober | H05B 6/68 |
| | | | | 219/711 |
| 2015/0379361 | A1* | 12/2015 | Boulanger | H04N 5/33 |
| | | | | 701/2 |
| 2016/0074724 | A1* | 3/2016 | Terre | G01S 17/66 |
| | | | | 356/4.01 |
| 2016/0156880 | A1* | 6/2016 | Teich | H04N 5/225 |
| | | | | 348/82 |
| 2016/0266256 | A1* | 9/2016 | Allen | G06K 9/00791 |
| 2016/0273970 | A1* | 9/2016 | Alon | G01K 11/006 |
| 2017/0099988 | A1* | 4/2017 | Matloubian | A47J 37/0664 |
| 2017/0105572 | A1* | 4/2017 | Matloubian | H05B 6/80 |
| 2017/0241843 | A1* | 8/2017 | Jeon | H04N 5/23293 |
| 2017/0290095 | A1* | 10/2017 | Pereira | G06N 3/084 |
| 2017/0332841 | A1* | 11/2017 | Reischmann | A47J 37/0786 |
| 2018/0059014 | A1* | 3/2018 | Ruback | G01N 21/3563 |
| 2018/0209853 | A1* | 7/2018 | Kraus | G01J 5/602 |
| 2018/0270918 | A1* | 9/2018 | Kweon | H05B 6/72 |
| 2018/0302564 | A1* | 10/2018 | Liu | H04N 17/002 |
| 2018/0324908 | A1* | 11/2018 | Denker | G06T 7/0002 |
| 2018/0345485 | A1* | 12/2018 | Sinnet | G06Q 10/06311 |
| 2018/0366354 | A1* | 12/2018 | Nguyen | H01J 37/32522 |
| 2019/0339159 | A1* | 11/2019 | Israelsen | H04N 5/33 |
| 2019/0349213 | A1* | 11/2019 | Shive | H04L 12/2829 |
| 2020/0074204 | A1* | 3/2020 | Koesters | G06K 9/4652 |

* cited by examiner

800

802 At an oven including a control unit, a display, and a cooking chamber, wherein the cooking chamber includes a first camera that includes a first array of color image sensors corresponding to a first resolution, a second camera that includes a second array of thermal image sensors corresponding to a second resolution lower than the first resolution, one or more heating elements, and a food support platform:

804 In accordance with instructions provided by the control unit, concurrently capturing a first image using the first camera and a second image using the second camera, wherein each of the first image and the second image includes respective sets of pixels corresponding to one or more food items placed on the food support platform, wherein the first image is of the first resolution and captured from a first perspective relative to the one or more food items, and wherein the second image is of the second resolution and captured from a second perspective distinct from the first perspective relative to the one or more food items

806 Performing a first image processing on the first image to identify respective sets of pixels in the first image that correspond to each of the one or more food items captured in the first image

808 In accordance with established calibration rules, establishing correlations between pixels of the second image to respective sets of pixels corresponding to the one or more food items identified in the first image, wherein the established calibration rules associate the first perspective to the second perspective and the first resolution and the second resolution

810 Generating a temperature map for the one or more food items with the second resolution in accordance with the established correlations between the pixels of the second image to the respective sets of pixels corresponding to the one or more food items identified in the first image

Figure 8

Cooking Appliance 900

SYSTEM AND METHOD FOR TEMPERATURE SENSING IN COOKING APPLIANCE WITH DATA FUSION

FIELD OF THE TECHNOLOGY

The present disclosure relates to the field of cooking appliances, and in particular, to systems and methods for determining food item temperature during cooking using data fusion techniques.

BACKGROUND OF THE TECHNOLOGY

Conventional food preparation systems, such as electric cookers, ovens, and steamers, etc. may be equipped with thermal sensors (e.g., thermal imaging cameras) to continuously monitor food item temperature during cooking. For example, thermal imaging cameras can capture thermographic images or videos by recording infrared radiation that reflects temperature distribution in food items. However, resolution of the thermal sensors are poor, and high resolution thermal sensors are too expensive for use in home appliances.

For at least these reasons, improved systems and methods for recording food item temperature information during cooking are highly desirable.

SUMMARY

Although temperature detection with thermal imaging cameras is convenient, a major drawback is that thermal imaging cameras often produce images or videos with much lower resolution compared to those produced by optical cameras. For example, thermal imaging cameras typically have imaging sensor resolutions in the range of low thousands of pixels (e.g., 50×50 pixels), whereas a conventional smartphone camera can have millions of pixels in its image sensor (e.g., the Huawei P30 Pro smartphone has a camera with 7360×4912 pixels). Although thermal imaging cameras with higher sensor resolution (e.g., capable of producing thermographic images or videos with higher resolution) are available, their cost increases exponentially as the resolution improves. As an example, a smartphone optical camera with resolution in millions of pixels typically cost a few dollars, while a thermal imaging camera with resolution in low thousands of pixels typically cost hundreds of dollars. Therefore, although thermal imaging cameras can capture temperature information of food items during cooking, they suffer in producing images with good structural detail (e.g., images with high spatial resolution) at reasonable price point. For at least these reasons, improved systems and methods for recording food item temperature information during cooking with high spatial resolution, such as by fusing temperature data from thermal imaging cameras with spatial data from optical cameras, are desirable.

The present disclosure describes a system and method for capturing food item temperature information with high spatial resolution by fusing temperature data recorded by thermal imaging cameras with spatial data recorded by optical cameras. At the start of the temperature detection process, a camera calibration process is initiated to generate calibration data for the cooking appliance's imaging system comprising at least one thermal imaging camera and at least one optical camera. The generated calibration data includes a set of camera parameters for each camera, as well as transformation parameters for mapping and matching objects captured in one camera's 2D image coordinates to another camera's 2D image coordinates.

During the temperature detection process, the thermal imaging camera and the optical camera each captures separate images (or videos) of food items placed inside the cooking appliance. The images captured by the thermal imaging camera are thermographic images with information indicating temperature distribution on food items, while the images captured by the optical camera are RGB (or greyscale) images showing structural detail of the food items at high spatial resolution. The thermal images are next transformed using the generated calibration data such that the one or more food items captured on the thermal images are matched and mapped to the corresponding food items captured on the RGB images. After the matching and mapping process is complete, a synthesized image is generated using the structural detail of food items from the RGB images and temperature information from the thermal images. As a result, the synthesized image shows detailed temperature distribution on each food item with high spatial resolution. Next, the synthesized image is displayed on the cooking appliance for a user to visually see temperature information of food items in real-time. In some embodiments, the thermal imaging cameras and the optical cameras record videos of the food items instead of taking discrete temporal images. As a result, a synthesized video is generated and displayed on the cooking appliance showing on the food items not only temperature distribution but also temperature evolution in real-time.

Based on the systems and methods described herein, various issues associated with temperature sensing in cooking appliances can be reduced. Low resolution thermal images are transformed to fuse temperature data of one or more food items with spatial data of the same food items captured on high-resolution RGB (or greyscale) images. As a result, a user can see in real-time temperature information of food items being prepared and can adjust cooking parameters accordingly to achieve better cooking results.

In one aspect, in accordance with some embodiments, a method is performed by a computing system that is communicably coupled with a cooking appliance and that is configured to control one or more functions of the cooking appliance.

In accordance with some embodiments, a computing system includes processors and memory storing instructions that, when executed, causes the one or more processors to perform the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause performance of the operations of any of the methods described herein. In accordance with some embodiments, an electronic device includes: means for capturing images, means for heating food items, and means for performing or causing performance of the operations of any of the methods described herein.

Various advantages of the disclosed technical solutions are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIG. 8 illustrates a flowchart of a method of generating high-resolution image with temperature information.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1A:
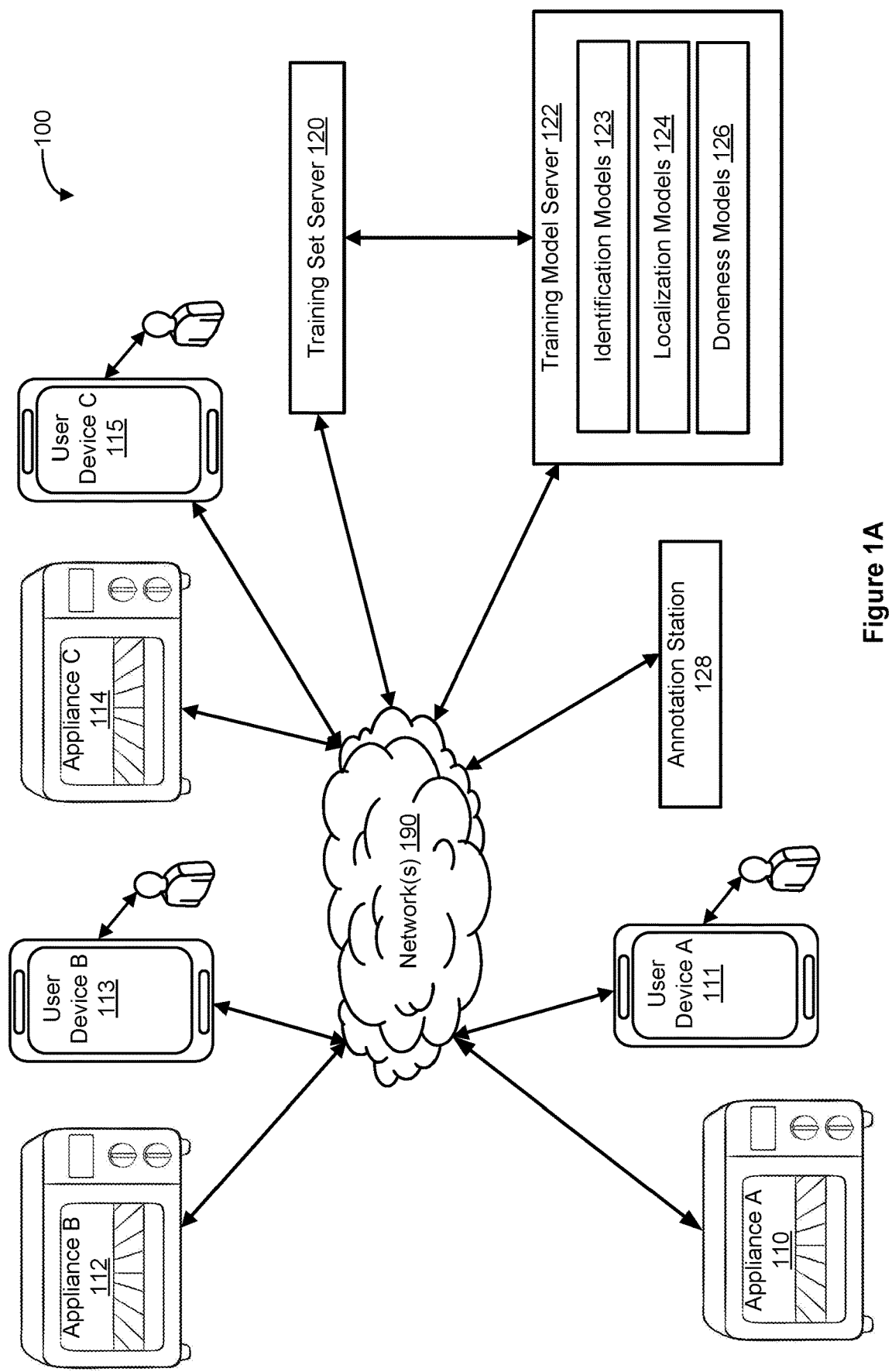
FIG. 1A shows a block diagram of an operation environment of a food preparation system (e.g., including a smart cooking appliance and related servers), in accordance with some embodiments.

FIG. 1A shows a block diagram of an operation environment 100 of a food preparation system (e.g., including a smart cooking appliance and related servers) in accordance with some embodiments.

The operation environment 100 of a food preparation system includes one or more cooking appliances (e.g., appliance A 110, appliance B 112, and appliance C 114), connected to one or more servers (e.g., training set server 120 and training model server 122), and optionally to one or more user devices (e.g., user device A 111, user device B 113, and user device C 115) and/or annotation station(s) 128, via network 190 (e.g., a wide area network such as the Internet, or a local area network such as a smart home network).

In some embodiments the one or more cooking appliances (e.g., smart ovens, smart stovetops, etc.) are configured to collect raw sensor data (e.g., image, weight, temperature, thermal map data, etc.) and send the raw sensor data to corresponding user devices (e.g., smart phones, tablet devices, etc.), annotation station 128 (e.g., workstations and desktop computers), and/or training set server 120 (e.g., server provided by the manufacturer of the cooking appliances or third-party service providers for the manufacturer). In some embodiments, the one or more cooking appliances are also configured to receive control instructions from training model server 122 and/or a corresponding user device (e.g., appliance A 110 may receive control instructions from training model server 122 to set the smart oven temperature to 425° F. for roasting vegetables and appliance A 110 may receive control instructions from user device A 111 to change the temperature to 400° F.). Additional details regarding the one or more cooking appliances (e.g., appliance A 110, appliance B 112, and appliance C 114) is described in detail with reference to other parts of the present disclosure.

In some embodiments, the one or more user devices are configured to receive raw sensor data from a respective appliance (e.g., user device A 111, which corresponds to appliance A 110, is configured to receive raw sensor data from appliance A 110). In some embodiments, the one or more user devices are also configured to send annotated data to annotation station 128 and/or training set server 120. In some embodiments, the one or more user devices are configured to generate and send control instructions to the respective appliance (e.g., user device A 111 may send instructions to appliance A 110 to turn appliance A 110 on/off or to adjust a setting on appliance A 110, such as turning on a broiler or changing the temperature of a smart oven). In some embodiments, the one or more user devices include, but is not limited to, a mobile phone, a tablet, or a computer device. In some embodiments, one or more user devices may correspond to one appliance (e.g., a computer and a mobile phone may both correspond to appliance A 110 (e.g., both are registered to be a control device for appliance A in an appliance setup process) such that appliance A 110 may send raw sensor data to either or both the computer and the mobile phone). In some embodiments, a user device corresponds to (e.g., shares data with and/or is in communication with) an appliance (e.g., user device A 111 corresponds to appliance A 110). For example, appliance A 110 may collect data (e.g., raw sensor data, such as images or temperature data) and send the collected data to user device A 111 so that the collected data may be annotated by a user on user device A 111.

In some embodiments, annotation station 128 is configured to receive collected data from the one or more appliances (e.g. appliances 110, 112, and 114) so that the collected data may be annotated by specialized annotation personnel. In some embodiments, annotation station 128 is configured to receive annotated data from the one or more user devices (e.g., user devices 111, 113, and 115) for review, editing, and/or approval by the specialized annotation personnel. In some embodiments, when annotated data from the one or more user devices have been approved at annotation station 128, annotation station sends the approved data to training set server 120 to be included in the training corpus stored at the training set server. In some embodiments, annotation station 128 retrieves annotated data from server 120 for review, editing, and/or approval by the specialized annotation personnel. In some embodiments, annotation station 128 retrieves unannotated data from server 120 for annotation by the specialized annotation personnel. Sensor data that has been annotated and/or approved at annotation station 128 is returned to server 120 for inclusion in the training corpus.

In some embodiments, training set server 120 is configured to receive raw sensor data from the one or more cooking appliances (e.g. appliances 110, 112, and 114), and/or receive annotated data from the one or more user devices (e.g., user devices 111, 113, and 115). In some embodiments, training set server 120 is also configured to send raw and/or annotated data to annotation station 128, and receive annotated and/or approved annotated data from annotation station 128. Training set server 120 is configured to preprocess the annotated data, e.g., to group, divide, and correlate the training data, and index and store the training data, in accordance with the training models and training methods employed by training model server 122. Training set server 120 is configured to send selected training data (e.g., data that includes, corresponds to, or is based on annotated data that has been approved at annotation station 128) to training model server 122, in accordance with the particular training model requesting the training data.

In some embodiments, training model server 122 is configured to receive training data from training set server 120. Training model server is also optionally configured to send control instructions (e.g., machine instructions prepared according to the control protocols of a particular cooking appliance) and/or send text data (e.g., text messages) to the one or more appliances and/or user devices. Training model server 122 includes identification models 123 (e.g., also referred to as food item identity determination model"), localization models 124 (e.g., also referred to as "food item location and outline determination model"), and doneness models 126 (e.g., also referred to as "cooking progress level determination model"). Identification models 123 are related to identifying food items being cooked in a cooking appliance. Localization models 124 are related to locating food items currently being cooked in a cooking appliance. For example, localization models 124 may be used to identify two pieces of chicken on a left side of the oven rack of the smart oven and four cookies on the right side of the oven rack of the smart oven, and outline each of them in an image captured by the smart oven. Doneness models 126 are related to determining the cooking progress level or the "done-ness" of food items present in a cooking appliance. For example, doneness models 126 may include models for determining whether a food item is fully cooked (e.g., doneness models 126 may allow a smart stovetop to determine that a piece of steak is cooked to medium-rare) or 80% cooked. Training model server 122 trains identification model 123, localization models 124 and/or doneness models 126 based on training data received from training set server 120. Once the training of identification models 123, local- ization models 124 and doneness models 126 are sufficiently completed (e.g., achieved a threshold level of accuracies), the training set server 120 receives requests from cooking appliances to determine food item identities and locations, and/or cooking progress levels of food items in real-time based on sensor data captured by the cooking appliances. In some embodiments, the cooking progress levels determined by the training set server 120 is provided back to the requesting cooking appliances, such that each cooking appliance determines an appropriate action, e.g., changing an operation of the cooking appliance and/or alerting a user, based on the determined cooking progress levels.

In some embodiments, cooking appliances (e.g. appliances 110, 112, and 114), user devices (e.g., user devices 111, 113, and 115), annotation station 128, training set server 120, and training model server 122 are connected (e.g., sharing data with and/or in communication with) through one or more networks 190. One or more networks 190 may include wired and wireless networks and may be a local area network of a home or a wide area network (e.g., Internet).

Figure 1B:
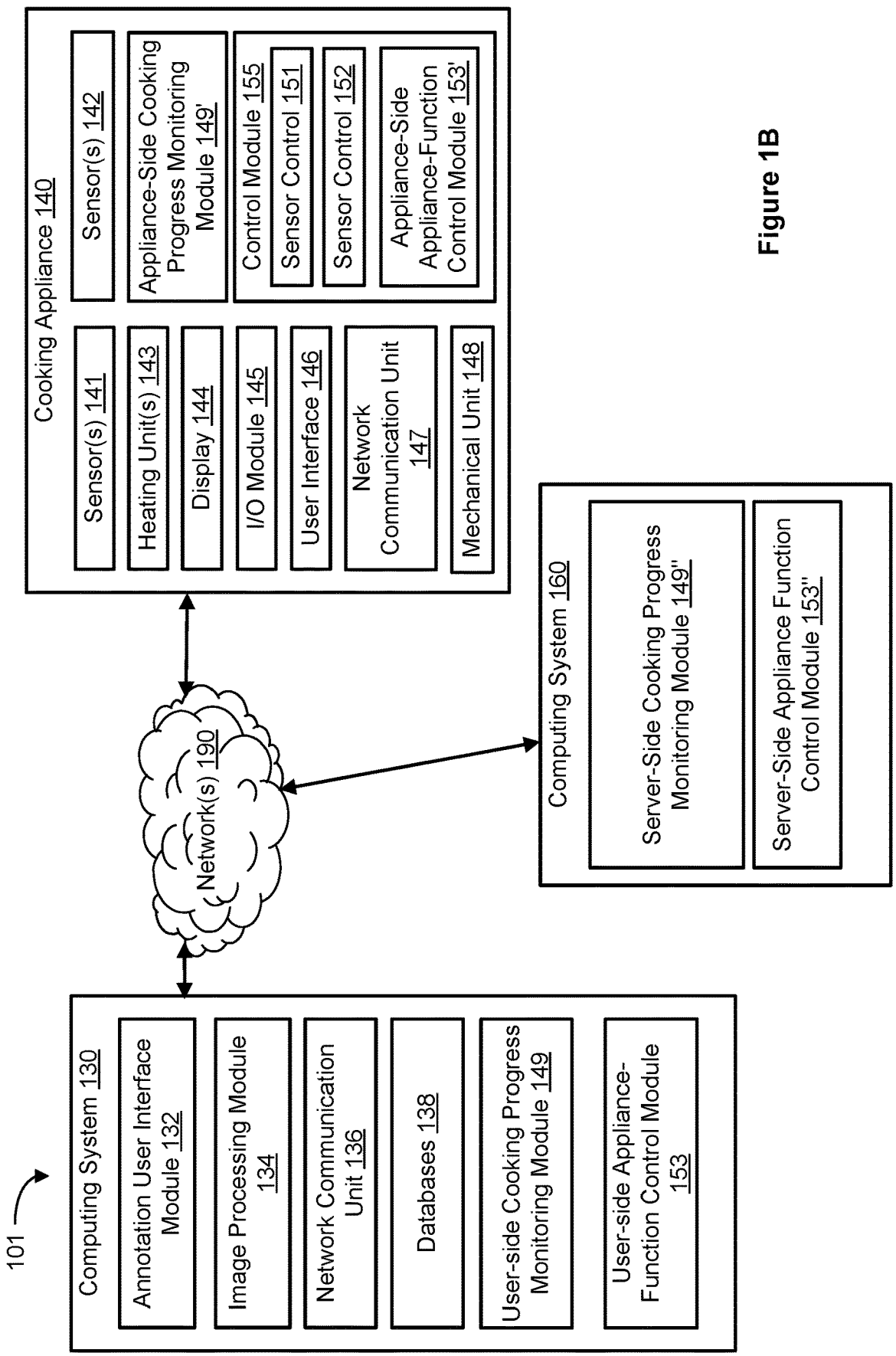
FIGS. 1B-1C show block diagrams of a food preparation system, in accordance with some embodiments.

FIG. 1B shows block diagrams of a food preparation system 101 in accordance with some embodiments.

In some embodiments, as shown in FIG. 1B, food preparation system 101 includes cooking appliance 140 and computing system 130 that is implemented separately from cooking appliance 140. Cooking appliance 140 can serve as any of cooking appliances 110, 112, and 114 in FIG. 1A. In some embodiments, computing system 130 is in communication with cooking appliance 140 through one or more networks 190. In some embodiments, computing system 130 is implemented on a user device (e.g., in association with a user application for controlling and interacting with the cooking appliance). In some embodiments, computing system 130 and appliance 140 further communicate with computing system 160 to accomplish some of the functions on computing system 130 and appliance 140 in accordance with a client-server configuration. In some embodiments, computing system 160 is implemented on a server of a manufacturer of the cooking appliance (e.g., on training model server 122). In some embodiments, computing system 160 is implemented on a standalone computer (e.g., on a local server of a smart home).

Referring to FIG. 1B, computing system 130 includes one or more of annotation user interface module 132, imaging processing module 134, network communication unit 136, and one or more databases 138. Computing system 130 corresponds to user devices as described above with respect to FIG. 1A (e.g., user devices 111, 113, and 115). In some embodiments, computing system 130 further includes user-side cooking progress monitoring module 149 and user-side appliance-function control module 153 to facilitate the cooking progress monitoring and appliance control aspects of the food preparation system, in addition to the data collection and annotation aspect of the food preparation system as described herein.

In some embodiments, annotation user interface module 132 allows a user of computing system 130 to view and annotate raw sensor data received from a corresponding appliance 140 (e.g., appliance 110, 112, or 114). For example, a user may use an application on their user device (e.g., user device 111, 113, or 115) to view images and temperature data recorded by a corresponding appliance. The user may be able to add annotations and details to the collected data, described in further detail below with respect to FIG. 3, for example.

In some embodiments, image processing module 134 obtains images captured by an imaging system of appliance 140 and processes the images for analysis. The functions of image processing module 134 and the imaging system of appliance 140 are described below with respect to FIG. 2, for example.

Network communication unit 136 allows computing system 130 to communicate with appliance 140 and/or computing system 160 over one or more networks 190.

In some embodiments, databases 138 include a database of previously captured images of food items or images from other similar food preparation systems. In some embodiments, databases 138 includes ingredient databases that allow the computing system to provide nutritional information and recipes to the user.

In some embodiments, computing system 130 includes an application that provides user-side functions, such as user-side cooking progress monitoring and appliance-function control, in conjunction with computing system 160 and appliance 140. In some embodiments, the application also provides access to a social network for the user to exchange cooking images and recipes with others using the same or similar appliances, and/or to contact the manufacturer or service providers for information and services related to the appliance 140.

In some embodiments, user-side cooking progress monitoring module 149 is configured to determine cooking progress of food items based on real-time sensor data captured by appliance 140 using food item location and outline determination models and food cooking progress level determination models that have been trained on computing system 160. In some embodiments, user-side cooking progress monitoring module 149 is configured to determine the cooking progress of food items locally using a local copy of the food item location and outline determination models and food cooking progress level determination models. In some embodiments, the user-side cooking progress monitoring module 149 sends a request to computing system 160, and receive the determination results in real-time from the computing system 160. The request includes real-time sensor data captured by appliance 140, and the results are determined using food item location and outline determination models and food cooking progress level determination models that have been trained on computing system 160.

In some embodiments, user-side appliance-function control module 153 is configured to provide a user interface for the user to directly control the appliance functions (e.g., turning the appliance on/off or setting an appliance parameter, etc.), and/or automatically generate control instructions based on the result of the cooking progress monitoring. In some embodiments, the result of the cooking progress monitoring is provided to the user-side appliance-function control module 153 from the user-side cooking progress monitoring module 149. In some embodiments, the result of the cooking progress monitoring is provided to the user-side appliance-function control module 153 from computing system 160. In some embodiments, the result of the cooking progress monitoring is provided to the user-side appliance-function control module 153 from appliance 140.

In some embodiments, appliance 140 includes one or more first sensors (e.g., sensors 141), one or more heating units 143, display 144, I/O module 145, user interface 146, network communication unit 147, mechanical unit 148, control module 155, imaging system, and, optionally, appliance-side cooking progress monitoring module 149'. Control module 155 includes an optional appliance-side appliance-function control unit 153'.

In some embodiments, the one or more first sensors 141 are configured to capture structured data, such as temperature, weight, and/or humidity. Structured data, as discussed herein, refers to quantitative or state data such as temperature, humidity, time, on/off, oven mode, etc. For example, the one or more first sensors 141 may be a temperature sensor (e.g., thermometer) or a humidity sensor, or weight sensor on the food support platform of the cooking appliance 140.

In some embodiments, the one or more heating units 143 are configured to heat at least a portion of the cooking compartment of the appliance (e.g., a heating coil configured to heat a cooking chamber). Further examples of the function of one or more heating units 143 are provided below with respect to FIG. 2, for example.

In some embodiments, appliance 140 includes a display 144 that can provide information about appliance 140 to a user (e.g., the broiler function of the smart oven is currently turned on). In some embodiments, display 144 may be integrated with I/O module 145 and user interface 146 to allow the user to input information into or read out information from appliance 140. In some embodiments, display 144 in conjunction with I/O module 145 and user interface 146 provides recommendations, alerts and nutritional information to the user and receive control instructions from the user (e.g., via hardware and/or software interfaces provided by appliance 140). In some embodiments, display 144 may be a touch screen display or a display that includes buttons. In some embodiments, display 144 may be a simple display with no touch-screen features (such as a conventional LED or LCD display) and user interface 146 may be hardware buttons or knobs that can be manually controlled. In some embodiments, user interface 146 optionally includes one or more of the following a display, a speaker, a keyboard, a touch-screen, a voice input-output interface etc.

Network communication unit 147 allows appliance 140 to communicate with computing system 130 and/or computing system 160 over one or more networks 190.

Mechanical unit 148 described herein refers to hardware and corresponding software and firmware components of appliance 140 that are configured to physically change the internal sensing (e.g., imaging), heating and/or food layout configuration of the cooking appliance 140. For example, the one or more first sensors 141 may correspond to a mechanical unit such that the one or more sensors 141 are movable to scan a respective area in a cooking compartment of appliance 140 (e.g., a motor may be configured to move a sensor across a predetermined area in order to capture data across the predetermined area). In another example, the food support platform of the cooking appliance may correspond to a mechanical unit including motors and/or robotic arms to change the relative positions of the heating elements and various parts of the food supporting platform, and/or to move food items to different parts of the food support platform or food storage compartment inside the cooking appliance. In some embodiments, the mechanical units 148 of the appliance 140 are operated in accordance with instructions from the appliance-function control unit of the food preparation system (e.g., appliance-side appliance-function control module 153', user-side appliance-function control module 153, and/or server-side appliance-function control module 153").

In some embodiments, appliance-side cooking progress monitoring module 149' is configured to monitor food that is present in a cooking compartment or cooktop of appliance 140. For example, appliance-side cooking progress monitoring module 149' may, based on raw data recorded by the one or more first sensors 141 and/or the one or more second sensors 142, determine that the food has been cooked to medium doneness. In some embodiments, appliance-side cooking progress monitoring module 149' is configured to determine cooking progress of food items based on real-time sensor data captured by first sensors 141 and imaging system using food item location and outline determination models and food cooking progress level determination models that have been trained on computing system 160. In some embodiments, appliance-side cooking progress monitoring module 149' is configured to determine the cooking progress of food items locally using a local copy of the food item location and outline determination models and food cooking progress level determination models. In some embodiments, the appliance-side cooking progress monitoring module 149' sends a request to computing system 160, and receive the determination results in real-time from the computing system 160. The request includes real-time sensor data captured by appliance 140, and the results are determined using food item location and outline determination models and food cooking progress level determination models that have been trained on computing system 160.

In some embodiments, the imaging system includes one or more second sensors 142. The one or more second sensors 142 are configured to capture unstructured data. Examples of unstructured data include RGB images and thermal or infrared images. For example, the one or more second sensors 142 may be configured to capture or record still images or videos of the food present in a cooking compartment or cooktop of appliance 140. Further examples of the function of the one or more second sensors 142 are provided below with respect to FIG. 2. In some embodiments, imaging system includes a data storage system that stores the dimensions of the food cooking compartment, and the dimensions of the reference markers within the food cooking compartment, the distances between the camera and the various reference markers within the food cooking compartment, such that images taken by the cameras can be used to accurately determine the size and shape of the food items within the images. Thus, the imaging system eliminates the problems with conventional imaging systems which require the user's special attention to place a reference marker within the images or use images without the benefit of the size and location and orientation information of the items within the images. In some embodiments, the imaging system includes an image capture triggering system. For example, in some embodiments, the image capturing is triggered when the image capture triggering system detects that there has been a change in the field of view of the camera. For example, when the oven door is opened, the lighting condition in the oven will be changed, and the image capturing will be triggered in response to the opening of the oven door. In some embodiments, the image capturing is triggered when the food item starts to appear in the field of view of the camera. In some embodiments, the image capturing is triggered when then food item is completely inserted and the oven door is closed. In some embodiments, the image capture trigger system also instructs the camera to capture and store an image of the oven rack immediately before the oven door is opened, as the compartment baseline image of the interior of the oven. In some embodiments, the image capturing is triggered manually in response to a user's input, for example, after the user has inserted the food item into the food cooking compartment. Manual trigger is easier and less complicated to implement, and allows the user to purposefully capture images that best reflect the characteristics of the food item for ingredient recognition. In some embodiments, image processing module 134 obtains the images captured by the one or more second sensors 142, and preprocesses the images to remove the background from the images based on the compartment baseline image captured before the insertion of the food item. The compartment baseline image captures the exact condition of the food support platform in the food cooking compartment of the food preparation system, and provides an excellent filter for the images containing the food item to remove the background.

In some embodiments, control module 155 includes sensor control 151, sensor control 152, and appliance-side appliance-function control module 153'. Sensor control 151 is configured to control and adjust the one or more first sensors 141. For example, sensor control 151 may send instructions for the one or more first sensors 141 to record temperature data at 1-minute intervals. Sensor control 152 is configured to control and adjust the one or more second sensors 142. For example, sensor control 152 may send instructions for the one or more second sensors 142 to be moved along a first direction and to take capture a picture when the one or more second sensors 142 are at the starting position before being moved and at the final position after being moved.

Appliance-side appliance-function control module 153' is configured to control and adjust the various functions of appliance 140. For example, appliance-side appliance-function control module 153' may send instructions to heating units 143 to activate a first heating unit of the one or more heating units, or may send instructions to mechanical unit 148 to change the relative position of the food support platform. In some embodiments, appliance-side appliance-function control module 153' generates and send control instructions to various components of the appliance 140 based on preconfigured operation protocols (e.g., to implement the normal routine functions of the appliance 140). In some embodiments, appliance-side appliance-function control module 153' generates and send control instructions to various components of the appliance 140 based on real-time cooking progress monitoring of the food items within the cooking appliance (e.g., to adjust functions of the appliance 140 automatically without user intervention based on preset reactions protocols or programs). In some embodiments, appliance-side appliance-function control module 153' generates and send control instructions to various components of the appliance 140 based on real-time user instructions received from user devices or via user interface 146 of appliance 140. In some embodiments, the result of the cooking progress monitoring is provided to the appliance-side appliance-function control module 153' from the user-side cooking progress monitoring module 149. In some embodiments, the result of the cooking progress monitoring is provided to the appliance-side appliance-function control module 153' from computing system 160. In some embodiments, the result of the cooking progress monitoring is provided to the appliance-side appliance-function control module 153' from appliance-side cooking progress monitoring module 149'.

In some embodiments, computing system 160 includes server-side cooking progress monitoring module 149" and server-side appliance-function control module 153". In some embodiments, the server-side cooking progress monitoring module 149" employs identification models 123, localization models 124 and doneness models 126 shown in FIG. 1A to determine food item identity, location, outlines, and/or cooking progress levels of food items from real-time sensor data received from cooking appliance 140 (e.g., directly or through computing system 130). In some embodiments, computing system 160 is implemented by training model server 122 in FIG. 1A.

The functions of various systems within food preparation system 101 in FIG. 1B are merely illustrative. Other configurations and divisions of the functionalities are possible. Some functions of one sub-system can be implemented on another sub-system in various embodiments.

Figure 1C:
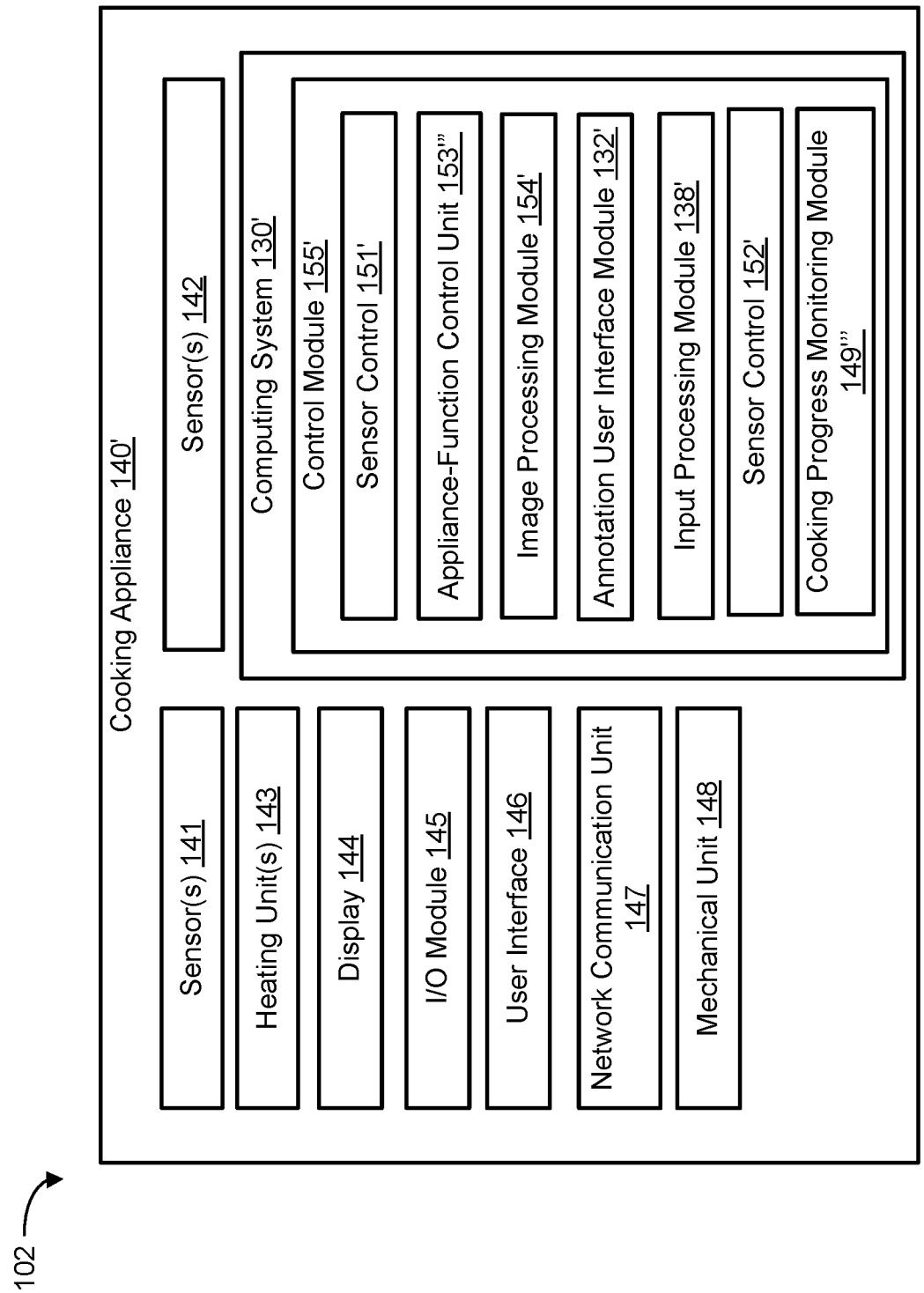

In some embodiments, as shown in FIG. 1C, food preparation system 102 includes a computing system 130' that is integrated with appliance 140'. In some embodiments, appliance 140' optionally communicates with computing system 160 to outsource some of the functions of appliance 140'.

Referring to FIG. 1C, appliance 140' has a built-in computing system 130'. Appliance 140' includes first sensors 141, second sensors 142, heating units 143, display 144, I/O module 145, user interface 146, network communication unit 147, mechanical unit 148, and imaging system. These components of appliance 140' correspond to those in appliance 140 and have similar functionalities that will not be repeated herein for brevity.

In some embodiments, computing system 130' within appliance 140' includes control unit 155', sensor control 151', sensor control 152', appliance-side cooking progress monitoring system 149''', appliance-side appliance-function control module 153''', image processing system 154', databases 138', and appliance-side annotation user interface module 132'. The functions of these components correspond to their respective counterparts with the same names in appliance 140 (e.g., sensor control 151' has the same function as sensor control 151) and will not be repeated for brevity. In some embodiments, annotation user interface module 132' may allow a user to view and annotate raw user data on a user device, separate from appliance 140'. In comparison, appliance-side annotation user interface module 132' may allow a user to view and annotate raw user data on display 144 of appliance 140' and/or annotate the cooking progress levels of food items in the images with voice input.

The above examples are provided merely for illustrative purposes. More details of the functions of the various components are set forth below with respect to other figures and illustrations. It can be understood that one or more components described herein may be used independently of other components.

Figure 2:
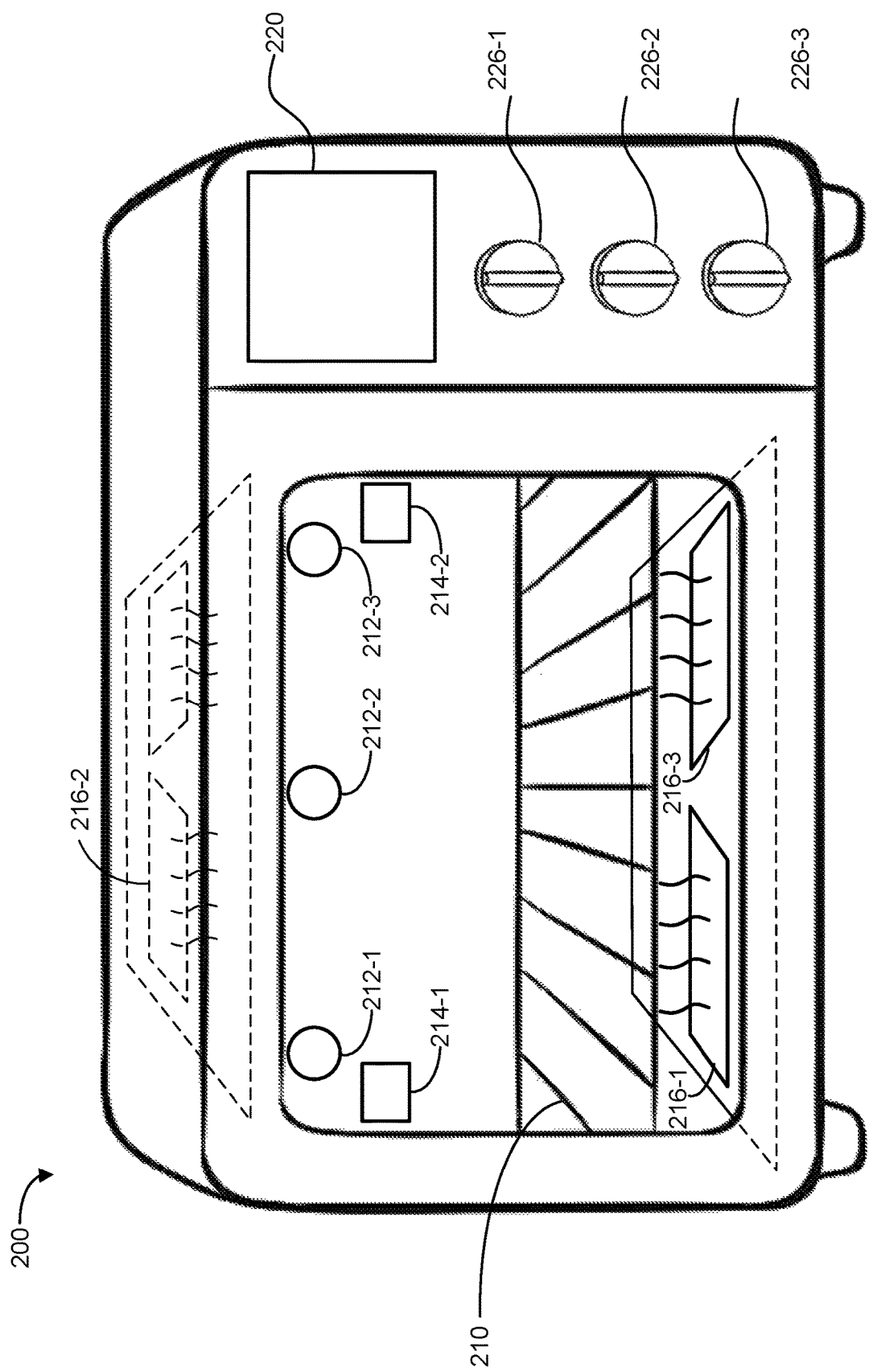
FIG. 2 is a schematic of a cooking appliance with a cooking chamber in accordance with some embodiments.

FIG. 2 is a schematic of a smart cooking appliance 200 with a cooking chamber that is configured to be used in the smart cooking appliance. In some embodiments, the smart cooking appliance is a smart oven (e.g., a wall oven, a toaster oven, a convection oven, a lidded grill oven, etc.) with an enclosed cooking chamber that has one or more heating surfaces. In some embodiments, the heat distribution within the enclosed cooking chamber is accomplished through radiation and convection (e.g., with or without the aid of a fan). In some embodiments, the smart cooking appliance has a function to heat the cooking chamber to a preset temperature and maintaining the cooking chamber at the preset temperature for an extended period of time. As shown in FIG. 1, an exemplary smart oven 200 includes a cooking chamber with six sides, front, back, left, right, top, and bottom sides.

Cooking appliance 200 includes food support platform 210 that is configured to support and hold food items (e.g., an oven rack in an oven, a pan on a stovetop, a plate in a microwave, a basket in an air fryer). Although only one food support platform 210 is shown in FIG. 2, cooking appliance 200 may include one or more food support platforms. In some embodiments, food support platform 210 includes mechanical unit 148 that can move and/or adjust a configuration of food support platform 210. For example, turning and churning mechanisms such as stirrers, rotisseries, and fans are configured to turn or rotate food items and redistribute the heat or the heating units around the food items. For example, a barbeque spit may be able to rotate in order to evenly cook food. In another example, an oven rack may have an adjustable height to move food towards or away from a broiler.

In some embodiments, cooking appliance 200 also includes one or more first sensors 141 (e.g., shown as first sensors 212-1, 212-2, and 212-3 in FIG. 2) and one or more second sensors 142 (e.g., shown as second sensors 214-1 and 214-2 in FIG. 2). For example, the one or more first sensors 212 and the one or more second sensors 214 may be located in situ. In some embodiments, the positions of one or more first sensors 212 and/or the one or more second sensors 214 are movable and/or adjustable. For example, cooking appliance 200 may include two first sensors that scan a respective predetermined area of the interior of cooking appliance 200. For example, the one or more second sensors 142 are part of an in situ imaging system (e.g., imaging system) that includes one or more still image cameras or video cameras (e.g., second sensors 214-1 and 214-2) that are installed at a location within or in proximity to the cooking appliance 200 such that the field of view of the cameras encompass the interior of the compartment in which food items will be inserted and cooked, or an exposed cooking surface of the cooking appliance (e.g., the heating surface of a grill pan or electric wok). The one or more second sensors 142 are directed to a food support surface 210 of cooking appliance 200. Each sensor of the one or more second sensors 142 can be located either inside of the cooking compartment of food preparation system 200 (e.g., see FIG. 2B, inside toaster oven 201) or directly above the food support surface. In some embodiments, the positions and orientations of one or more second sensors 142 are movable and/or adjustable. For example, food preparation system 200 may include two first sensors that scan a respective predetermined area of the interior of food preparation system 200. For example, the one or more cameras are optionally installed in the interior top wall of a smart oven, with a field of view of the top of the oven rack. Another camera is optionally installed on the top side edge of the interior of the oven, with a field of view of the oven rack from the side over the oven rack. In some embodiments, the camera is installed on the exterior of the compartment in which the food is cooked, and points at the location of the food item through a transparent window (e.g., a thermal insulating window). In some embodiments, the camera is placed outside of the compartment or over the platform on which the food items will be placed.

In some embodiments, cooking appliance 200 also includes one or more heating units 143 (e.g., shown as heating units 216-1, 216-2, and 216-3 in FIG. 2). For example, heating units 216-1, 216-2, and 216-3 may be three heating coils or three sections of an induction cooking surface. In some embodiments, heating units 216-1, 216-2, and 216-3 can be separately controlled to heat different portions of the cooking compartment or cooktop of food preparation system 200. Each heating unit is configured to respectively heat a predetermined area of the cooking compartment of food preparation system 200 so that different areas of the cooking compartment or stovetop can have different temperatures or heat up at different rates. This may be desirable for simultaneously cooking different types of food. For instance, heating unit 226-1 may be set at a first temperature or power for cooking chicken located in a first area of the cooking compartment and heating unit 226-2 may be set at a second temperature or power for cooking vegetables located in a second area of the cooking compartment so that the chicken and vegetables may be cooked concurrently at different temperatures and/or with different rates. In some embodiments, the positions and orientations of the one or more heating units 216 are movable and have adjustable parts such that they can be moved within the cooking compartment.

In some embodiments, cooking appliance 200 also includes display 220, serving as display 144 as described in FIGS. 1B and 1C. In some embodiments, display 220 is also a user interface (e.g., see FIGS. 1B and 1C, user interface 146) that allows users to input information (e.g., set a timer, start the appliance, set the temperature, set the cooking mode, snap a picture of the food items, query cooking status of food items, select an auto-generated cooking recipe, etc.) as well as receive information from food preparation system 200 (e.g., current temperature in cooking compartment/stovetop, time lapsed, food item identity, quantity, appearance, cooking progress level, predicted cooking results, cooking action recommendations, etc.).

In some embodiments, cooking appliance 200 also includes controls 226 (e.g., control knobs 226-1, 226-2, 226-3) that are used to adjust the cooking parameters of food preparation system 200 (e.g., adjust the power output of the heating units, cooking method, cooking temperature, heat distribution, cooking time). For example, control knob 226-1 may be used to control the temperature of heating unit 216-1. In some embodiments, controls 226 includes one or more of buttons, knobs, and touch-screen controls that respond to manual adjustments and to the control instructions (e.g., control instructions received from appliance-function control module 153, 153', or 153"). In some embodiments, controls 226 are incorporated into the display and user interface of food preparation system 200, as described above, such that the display and user interface allows the user to control and adjust the cooking functions and cooking parameters of food preparation system 200. For example, a user may input a desired temperature on the display of an oven and the oven may display the current temperature of the oven as well.

Figure 3:
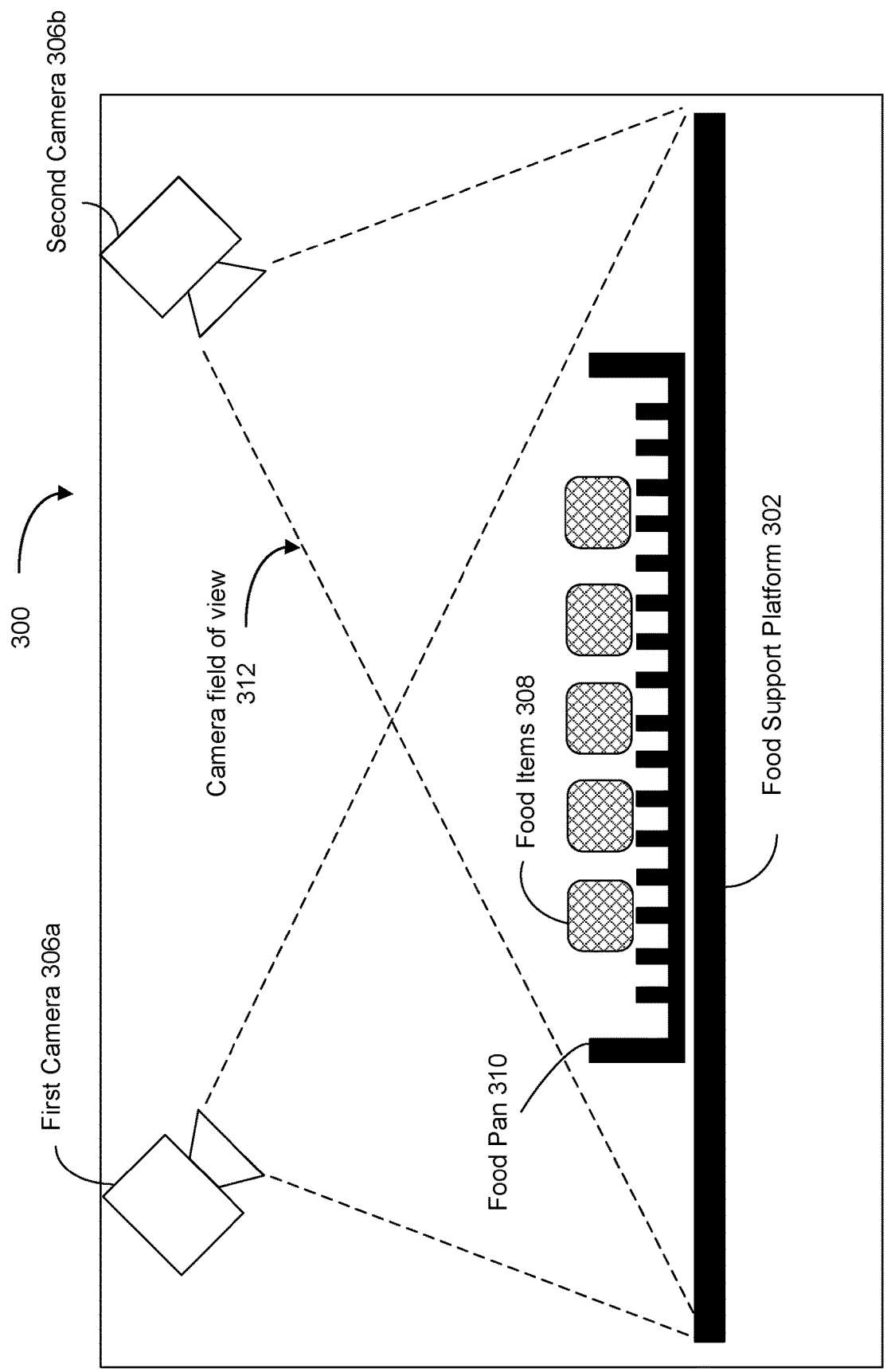
FIG. 3 is a schematic of an imaging system of a cooking appliance in accordance with some embodiments.

FIG. 3 is a schematic of an imaging system 300 of a cooking appliance in accordance with some embodiments. For example, imaging system 300 can be an example imaging system as described in FIG. 2. In some embodiments, the imaging system 300 includes first camera 306a and second camera 306b (e.g., corresponding to second sensors 142 of FIG. 1C or second sensors 214 of FIG. 2) installed at a location within or in proximity to the cooking appliance such that camera field of view 312 encompass the cooking surface of the cooking appliance. For example, if the cooking appliance is an oven, first camera 306a and second camera 306b can be installed within the oven chamber to direct the cameras' field of view towards an oven rack (e.g., food support platform 302). First camera 306a and second camera 306b can be enclosed within heat-resistant materials (e.g., thermal glass plates) to prevent heat damage to the cameras. In another example, if the cooking appliance is a stove top, first camera 306a and second camera 306b can be installed on a kitchen wall to oversee the cooking surface of the stove top.

In some embodiments, first camera 306a and second camera 306b takes images in different electromagnetic spectrum. In one example, first camera 306a is a thermal imaging camera capturing images in the IR spectrum, and second camera 306b is an optical camera capturing images in the visible spectrum. First camera 306a captures thermal images or videos that reflect infrared radiation and temperature distribution of objects (e.g., food items placed on food pan 310). Second camera 306b captures RGB (or grayscale) images or videos that show structural detail (e.g., shape, color, texture, edge, position, orientation) of objects. As described above, thermal images captured by first camera 306a are usually of lower pixel resolution to RGB images captured by second camera 306b, and thermal images include object temperature information not detected by RGB images. In some embodiments, both first camera 306a and second camera 306b have auto-focus and/or zoom functions to maintain camera focus on food items. In some embodiments, first camera 306a and second camera 306b are mounted on movable stations which allow the cameras to change position/orientation to redirect camera field of view.

In some embodiments, food support platform 302 is a movable platform that shifts position before, during, or after cooking. As food support platform 302 moves, first camera 306a and second camera 306b may shift focus or move accordingly to ensure camera field of view 312 encompasses the cooking surface.

In some embodiments, first camera 306a and second camera 306b captures images concurrently. In some embodiments, first camera 306a and second camera 306b can be controlled to capture images separately. First camera 306a and second camera 306b can be controlled by a software program running on the computing system of the cooking appliance (e.g., sensor control 152' in FIG. 1C).

Figure 6:
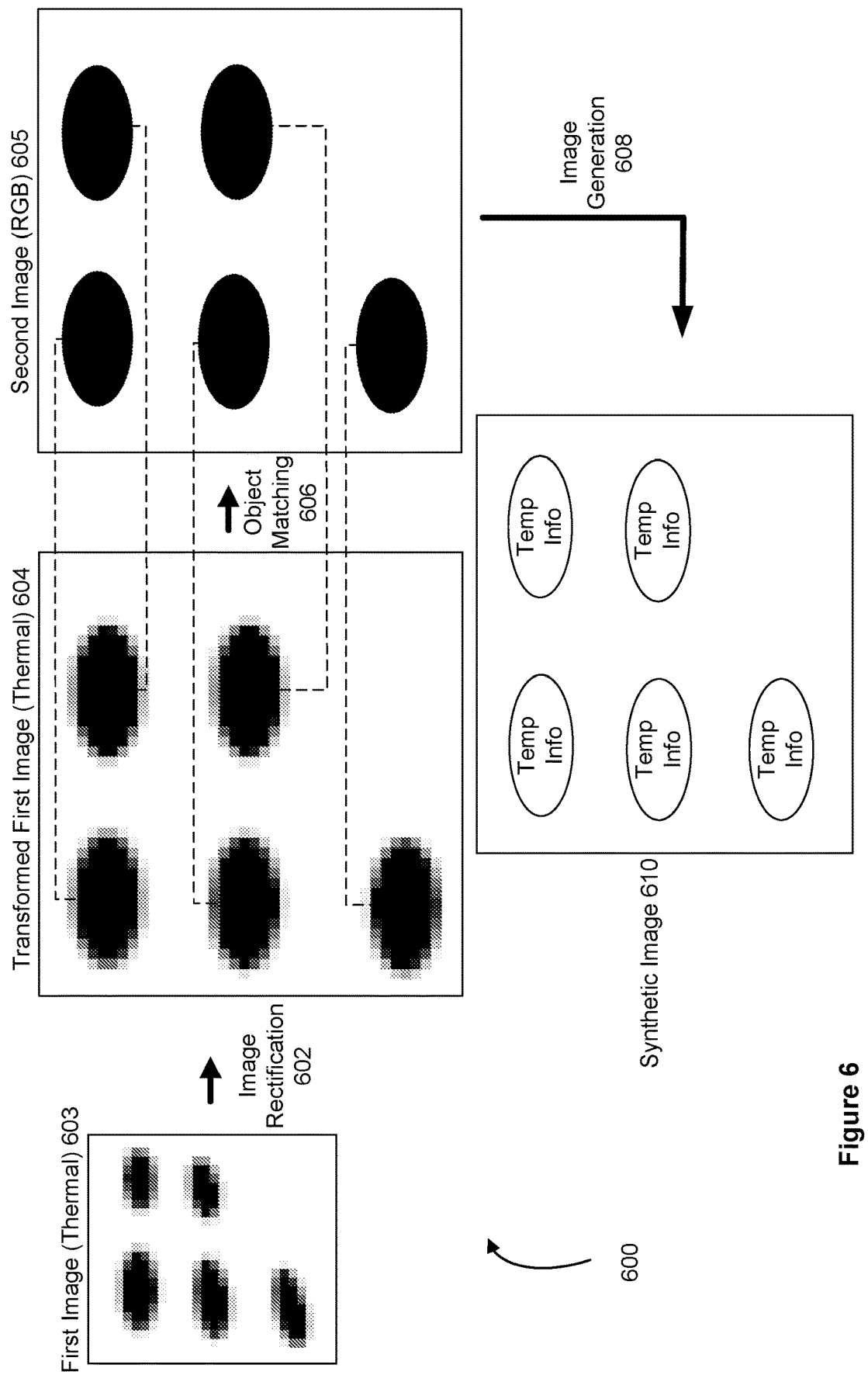
FIG. 6 illustrates a process for generating a high-resolution synthesized image by fusing images captured by different cameras in a cooking appliance in accordance with some embodiments.
Figure 7:
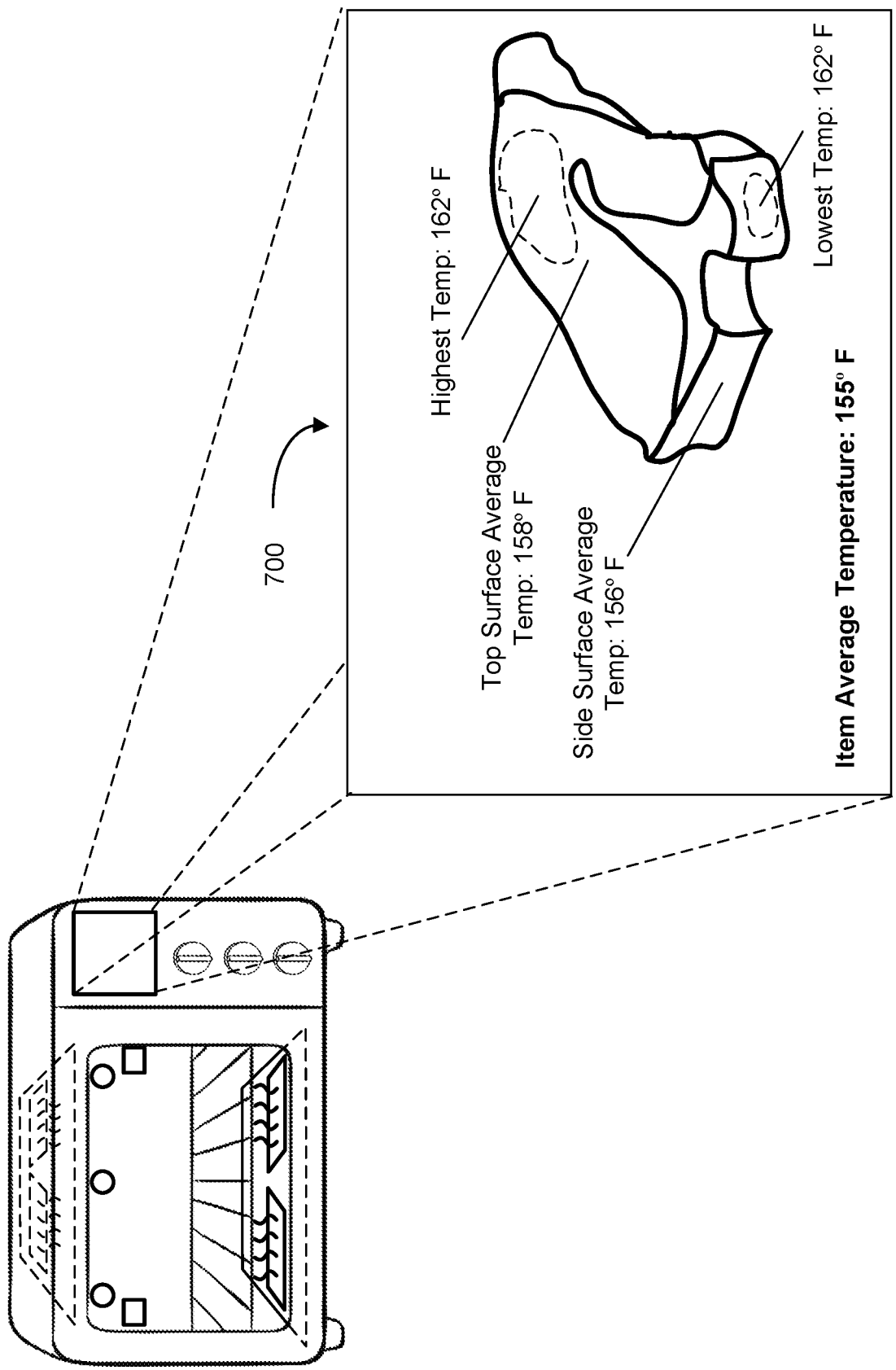
FIG. 7 illustrates a graphical user interface for displaying high resolution images with temperature information in accordance with some embodiments.

In some embodiments, after first camera 306a and second camera 306b concurrently capture images of food item 308, temperature information captured by first camera 306a (e.g., temperature distribution of food items as indicated by thermal images) are fused with spatial information captured by second camera 306b (e.g., shape and edge information of food items as indicated by RGB images) to generate synthesized images. For example, a computer (e.g., computing system 130' of FIG. 1C) embedded in the cooking appliance can have one or more software programs (e.g., image processing module 154' of FIG. 1C) to perform the image fusion to generate synthesized images. In another example, a remote computer (e.g., computing system 130 of FIG. 1B) communicably coupled to the cooking appliance's computer can process the images and send results back to the cooking appliance's computer. In some embodiments, synthesized images are generated taking advantages from both RGB images and thermal images. For example, the synthesized images can be generated at the same resolution as the RGB images captured by second camera 306b. The synthesized images can contain temperature information indicating temperature distribution of the food items (e.g., obtained from thermal images) and structural information indicating shapes and edges of the food items (e.g., obtained from RGB images). Refer to FIG. 6 and the related description on steps for fusing thermal images with RGB images to generate synthesized images. Refer to FIG. 7 and the related description for an exemplary synthesized image.

Although only one thermal imaging camera (first camera 306a) and one optical camera (second camera 306b) are shown in FIG. 3, in practice, multiple imaging devices of different types (e.g., cameras dedicated for different spectra or using different imaging techniques) can be included in the imaging system 300. As a result, each synthesized image can be generated by fusing together multiple captured images of different types.

Figure 5:
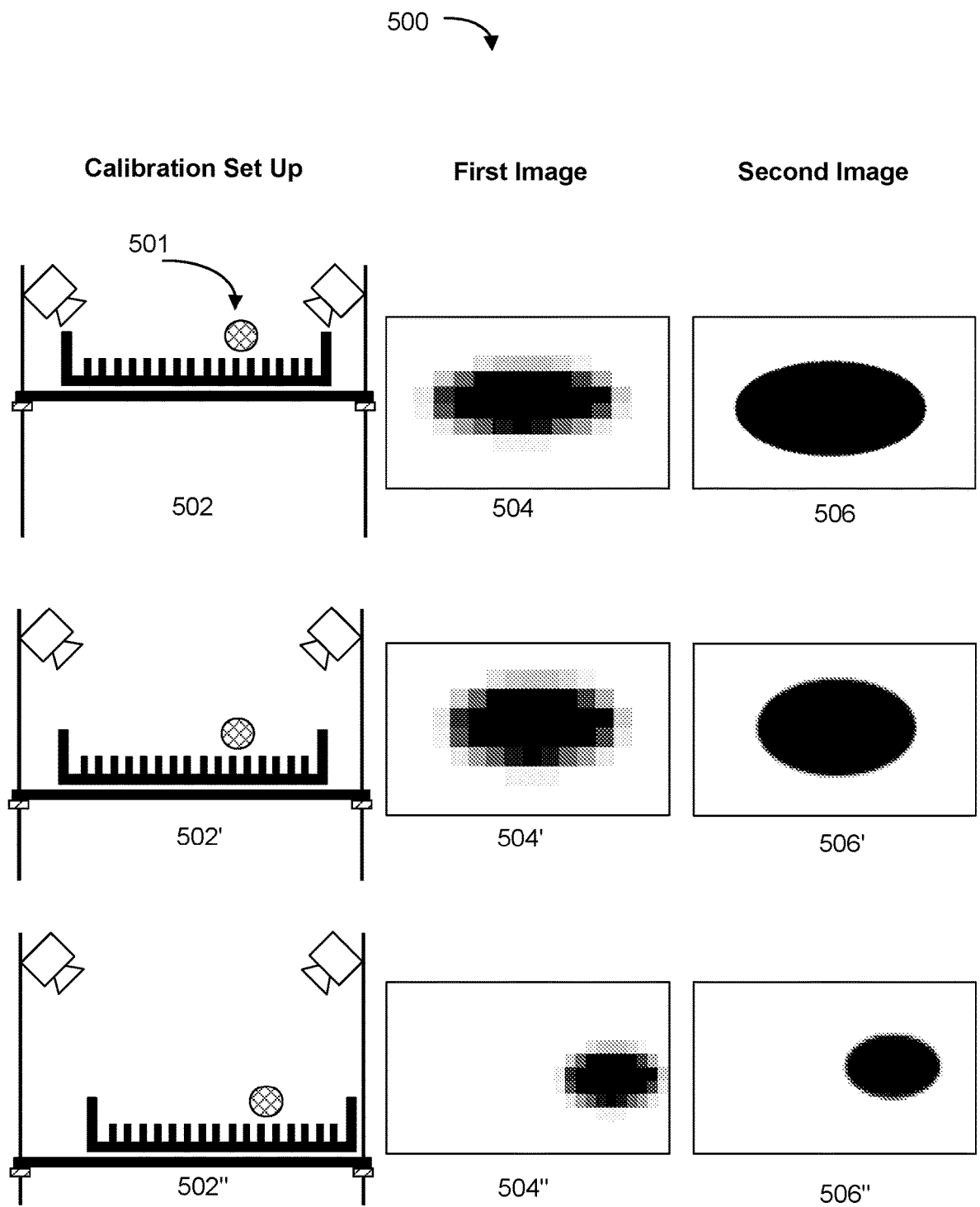
FIG. 5 illustrates a calibration process for an imaging system of a cooking appliance in accordance with some embodiments.

In some embodiments, prior to performing image fusion, a camera calibration procedure is performed to establish a correspondence between spatial coordinates of images captured by different cameras. The camera calibration procedure generates calibration data that can be used to match and map objects (e.g., food items 308) captured on one image to the same objects captured on other images. Refer to FIG. 5 and the related description for the camera calibration procedure.

Figure 4:
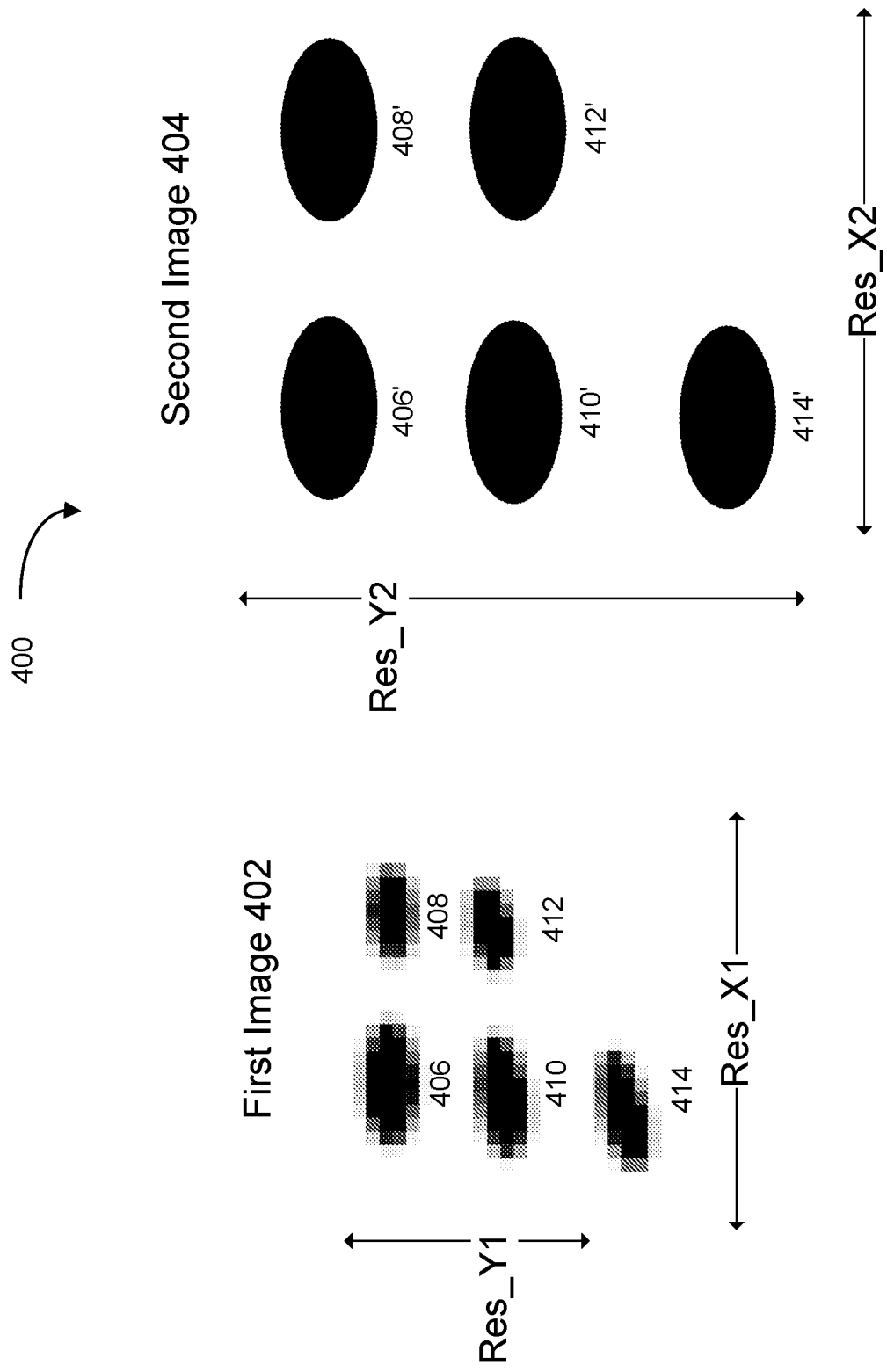
FIG. 4 illustrates two exemplary images captured by an image system of a cooking appliance in accordance with some embodiments.

FIG. 4 illustrates two exemplary images, first image 402 and second image 404, captured by an imaging system of a cooking appliance in accordance with some embodiments. In some embodiments, first image 404 is a thermal image captured by a thermal imaging camera (e.g., first camera 306a of FIG. 3) and second image 404 is a colored image (e.g., RGB image or grayscale image) captured by an optical camera (e.g., second camera 306b of FIG. 3). First image 402 and second image 404 capture the same group of objects (e.g., food items being prepared on a cooking appliance). Object 406, 408, 410, 412, and 414 on first image 402 correspond to object 406', 408', 410', 412', and 414', respectively. Due to the imaging devices being installed at different locations and orientations, objects captured on first image 402 appear to be slightly different from objects captured on second image 404. For example, object 414 appear to be of a different size, shape, and orientation compared to object 414'.

Furthermore, first image 402 and second image 404 are of different pixel resolutions. First image 402 is of the pixel resolution Res_X1 by Res_Y1, and second image 404 is of the pixel resolution Res_X2 by Res_Y2. As described before, second image 404 has higher pixel resolution compared to that of the first image 402. As a result, while objects 406, 408, 410, 412, and 412 appear to be pixelated on first image 402, the corresponding objects 406', 408', 410', 412', and 414' have greater clarity and sharper edge. For example, a typical optical camera can produce second image 404 of multimillions of pixels (e.g., 4096×2160 pixels), while a typical thermal imaging camera can produce first image 402 of thousands/hundreds of pixels (e.g., 162×120 pixels).

Although first image 402 has inferior pixel resolution compared to second image 404, first image 402 is useful in that it captures temperature information of the food items being prepared. As a thermal image, first image 402 shows different temperature of captured objects, for example, using a color palette to visualize temperature contrast.

Objects recorded on first image 402 can be matched and mapped to objects recorded on second image 404. The match and mapping process is described with respect to FIG. 7. In some embodiments, prior to performing the match and mapping process, the imaging system has to be calibrated to correspond 2D coordinates of first image 402 to 2D coordinates of second image 404. The camera calibration process is described with respect to FIG. 5.

FIG. 5 illustrates camera calibration 500 for an imaging system of a cooking appliance in accordance with some embodiments. Camera calibration 500 generates calibration data that can be used to relate coordinates of images (e.g., thermal images) captured by a first camera (e.g., first camera 306a of FIG. 3) to images (e.g., RGB images) captured by a different camera (e.g., second camera 306b of FIG. 3). The generated calibration data can then be used to generate synthesized images based on thermal images and RGB images taken of food items as described in FIG. 6 and the related description.

The goal of camera calibration 500 is to estimate camera parameters for each cameras in the cooking appliance's imaging system. Once the camera parameters for each camera are known, objects captured on different cameras can be correlated. For example, an image captured by a first camera showing an object can be transformed to approximate another image showing the same object captured by a second camera. Camera parameters include intrinsic parameters (e.g., focal length, optical center, skew coefficients, etc.), extrinsic parameters (e.g., camera position, field of view direction, etc.), and optionally lens distortion factors.

In some embodiments, to perform camera calibration 500, each camera takes multiple images of reference object 501 placed on a movable food support platform. For example, reference object 501 can be a food item or an object having special known geometric and/or visual patterns such as chessboard pattern to assist algorithmic detection and processing.

In some embodiments, during the data collection phase of camera calibration 500, the cameras take different images of reference object 501 at different locations—the movable food support platform translates to different positions. At position 502, the first and second camera take images of reference object 501 concurrently to produce first image 504 and second image 506, respectively. For example, first image is an thermal image of reference object 501 at a first resolution, and second image is an RGB image of reference object 501 at a second resolution, with the second resolution higher than the first resolution.

Next, the movable food support platform moves vertically downward to position 502', causing reference object 501 to be farther away from the cameras compared to that in position 502. At position 502', the first and second camera concurrently take images of reference object 501, producing image 504' and image 506' respectively. Due to reference object 501 being farther way from cameras at position 502', reference object 501 appears to be smaller in image 504' and 506' compared to that in 504 and 506. In some embodiments, the amount of vertical translation from position 502 to position 502' is known and used in the later camera calibration process.

Next, the movable food support platform moves both vertically and horizontally to position 502". The first and second cameras concurrently take images of reference object 501 at position 502". On image 504" and 506", reference object 501 appear both smaller (due to vertical downward translation) and shifted to the right (due to horizontal rightward translation). The shapes of the objects in the images 504" and 506" are also altered differently (e.g., with different skewing factors) as the camera positions change relative to the object.

Although only three positions of the movable support platform are shown in FIG. 5, in actual implementation, the movable food support platform can move reference object 501 to additional positions for the cameras to take images for data collection.

The collected data (e.g., images and translation distance) can then be used by a computer (e.g., computing system 130' of FIG. 1C) to calculate extrinsic and intrinsic parameters, as well as lens distortion factors. For example, well-known camera calibration methods such as Zhang's method or Tsai's algorithm can be used to produce camera parameter values. The produced camera parameter values can then be used to fuse high-resolution RGB images with low-resolution thermal images to generate synthesized images.

FIG. 6 illustrates process 600 for generating synthesized image 610 by fusing images captured by different cameras of an imaging system (e.g., imaging system 300 of FIG. 3) in a cooking appliance in accordance with some embodiments. For example, a computing system with an imaging processing software (e.g., computing system 130' and imaging processing module 154' of FIG. 1C) can perform process 600 locally on the cooking appliance or in a remote server and transfers the results to the cooking appliance via a network.

In some embodiments, the images being fused in process 600 includes first image 604 and second image 605. For example, first image 604 is a thermal image taken by a thermal imaging camera at a first resolution (e.g., first image 402 of FIG. 4), and second image 605 is an RGB image taken by an optical camera at a second resolution (e.g., second image 404 of FIG. 4), with the second resolution higher than the first resolution. Synthesized image 610 is of the same resolution as first image 604 and also includes temperature information recorded in first image 604.

In order to generate synthesized image 610, objects (e.g., food items) recorded on first image 603 need to be correlated to the respective objects recorded on second image 605. Establishing the correspondence between objects on first image 603 and second image 605 can be difficult as the same object can have different size, shape, or orientation on different images due to the cameras being placed at different locations and having different field of views. To achieve this, a camera calibration process (e.g., camera calibration 500 of FIG. 5) is first performed to obtain camera parameters that indicate geometric relation between the cameras. The imaging processing software then performs image rectification 602 using the obtained camera parameters so that objects on transformed first image 604 appear to have the same size, shape, and orientation as the corresponding objects on second image 605.

After generating transformed first image 604, imaging processing software next performs object matching 606 to match each object recorded on transformed first image 604 to the corresponding objects on second image 605. In some embodiments, during object matching 606, the image processing software performs the following steps:

1. Performs instance segmentation on transformed first image 604 and second image 605 to identify each of the objects on respective images.
2. Generates an edge map E1 of transformed first image 604 and an edge map E2 of second image 605—edge map E1 contains boundary information of all the segmented objects on transformed first image 604, and edge map E2 contains boundary information of all the segmented objects on second image 605. For example, the image processing software can use well-known edge-finding algorithms such as Canny edge detector to extract edge information.
3. Matches edge map E1 with edge map E2. For example, the imaging processing software can perform Hausdorf distance matching, Chamber distance matching, or other binary feature mapping algorithms.
4. Once edge map E1 is matched to edge map E2, the imaging processing software next establishes correspondence between objects on transformed first image 604 and second image 605.

After matching objects on the two images, the image processing software performs image generation 608 to generate synthesized image 610. Synthesized image 610 includes structural detail of objects recorded on second image 605, such as the edge, shape, and orientation of the objects at second resolution, and also temperature information such as the distribution of temperature on the objects as indicated on first image 603. In some embodiments, the temperature information is displayed using a color palette, with different colors on synthesized image representing different temperature. In some embodiments, the temperature information is displayed as annotations on synthesized image 610. An example of synthesized image is described in FIG. 7.

FIG. 7 illustrates a graphical user interface for displaying synthesized image 700 with temperature information in accordance with some embodiments. In some embodiments, the graphical user interface 702 is a display (e.g., display 220 of FIG. 2) of a cooking appliance (e.g., cooking appliance 200 of FIG. 2).

Synthesized image 700 is generated by fusing temperature data from thermal images with spatial data from RGB images as described in FIG. 6. Synthesized image 700 is of the same pixel resolution as the RGB images and includes temperature information from thermal images. In some examples, the temperature information on synthesized image 700 indicates different temperature at different places of the food item, as well as average temperature of the food item.

In some embodiments, text annotations are placed on synthesized image to indicate temperature information. Text annotations indicate the location on the food item of highest/ lowest temperature, temperature of different surfaces, as well as average temperature of the food item. A user of the cooking appliance can adjust cooking controls in real-time accordingly. For example, in the case of baking a steak, the user can change oven temperature or moving a movable food support platform to cause surfaces of the steak to reach desired searing temperature.

In some embodiments, instead of using text annotations to indicate temperature information, synthesized image 700 uses a predefined color palette to label different portions of the object with different colors to indicate temperature. For example, the predefined color pallete can be the same as the color palette used by the thermal images.

In some embodiments, instead of being presented as a still image, synthesized image 700 is a live video that shows temperature display of the objects in real-time. For example, the synthesized image generation process described in FIG. 6 continuously fuses frames of videos captured by the thermal imaging camera and the optical camera.

FIG. 8 illustrates a flowchart 800 of a method for generating a temperature map of one or more food items placed in a cooking appliance. In some embodiments, a computing system (e.g., computing system 130' of FIG. 1C) including a control module (e.g., control module 155' of FIG. 1C) running an image processing software (e.g., image processing 154' of FIG. 1C) performs the method of flowchart 800. In some embodiments, the computing system is part of a cooking appliance (e.g., cooking appliance 140' of FIG. 1C). The cooking appliance includes, a display (e.g., user interface 146 of FIG. 1C), a cooking chamber, a first camera (e.g., sensor 142 of FIG. 1C), a second camera (e.g., sensor 142 of FIG. 1C), one or more heating elements (e.g., heating unit 143 of FIG. 1C), and a food support platform. In some embodiments, the computing system is part of a remote server (e.g., computing system 130 of FIG. 1B), and communicates with a cooking appliance (e.g., cooking appliance 140 of FIG. 1B) via a network (e.g., network 190 of FIG. 1B).

As the first step in generating the temperature map, the control unit provides instructions to the first and second cameras to capture images of a food item placed within the cooking appliance. In accordance with the provided instructions, the first camera and the second camera concurrently capture a first image and a second image, respectively (804) of the food item. In some embodiments, the first camera is a thermal imaging camera and the second camera is an optical camera. The first and second cameras are located at different locations that capture images from different perspectives. In some embodiments, the first image is a thermal image of a first pixel resolution, and the second image is an RGB (or grayscale) image of a second pixel resolution.

Next, the control unit through the image processing software performs a first image processing on the first image (e.g., thermal image) to identify respective sets of pixels in the first image that correspond to each of the one or more food items captured in the first image (806). For example, the image processing software can use instance segmentation algorithms to identify the respective sets of pixels.

After identifying the respective sets of pixels that correspond to food items, the control unit through the image processing software establishes correlations between pixels of the second image to respective sets of pixels corresponding to the one or more food items identified in the first image in accordance with calibration rules (808). The established calibration rules associate the first perspective to the second perspective and the first resolution and the second resolution. For example, the image processing module can have previously established the calibration rules using extracted camera calibration parameters.

The image processing software then generates a temperature map for the one or more food items with the first resolution in accordance with the established correlations between the pixels of the second image to the respective sets of pixels corresponding to the one or more food items identified in the first image (810). In some embodiments, the temperature map uses a pre-defined color palette or text annotations to indicate temperature distribution on the food item. In some embodiments, the temperature map is further used to generate a synthesized image, wherein the synthesized image includes structural and spatial information of the food items at the pixel resolution of the second image (RGB/Grayscale image) with information from the temperature map.

In some embodiments, the temperature map is presented on the display of the cooking appliance as a new image. The user can adjust cooking controls by viewing real-time temperature information shown by the temperature map.

In some embodiments, the established calibration rules comprise first rectifying the first image to obtain a transformed first image, wherein the transformed first image is of the second resolution and from the second perspective relative to the food items. For example, rectifying the first image includes comparing the camera parameters of the first camera with the camera parameters of the second camera, and transforming the first image according to the difference between the camera parameters. Exemplary camera parameters include camera focal length, camera focal length, camera optical center, camera skew coefficients, camera position, camera field of view direction, and lens distortion factors. Once the first image is rectified, the image processing software performs instance segmentation on the rectified first image and the second image to obtain respective sets of food items. Next, the image processing software performs edge detection based on the segmented instances to establish a correspondence between pixels of the first image and pixels of the second image. For example, the image processing software can use well-known edge detector such as Canny edge detector to identify edges of the segmented instances, and use Hausdorf distance minimization or Chamber distance minimization algorithms to find the correspondence.

In some embodiments, the camera parameters for the first camera and the second camera are obtained and stored by the control unit during a camera calibration process. For example, the camera calibration can be performed according to steps described in FIG. 5.

In some embodiments, a reference object is used during the camera calibration process. For example, the reference object can have predefined shape, size, pattern, or heat absorbance coefficients such as thermal images taken by the first camera and RGB images taken by the second camera are of high contrast.

Figure 9:
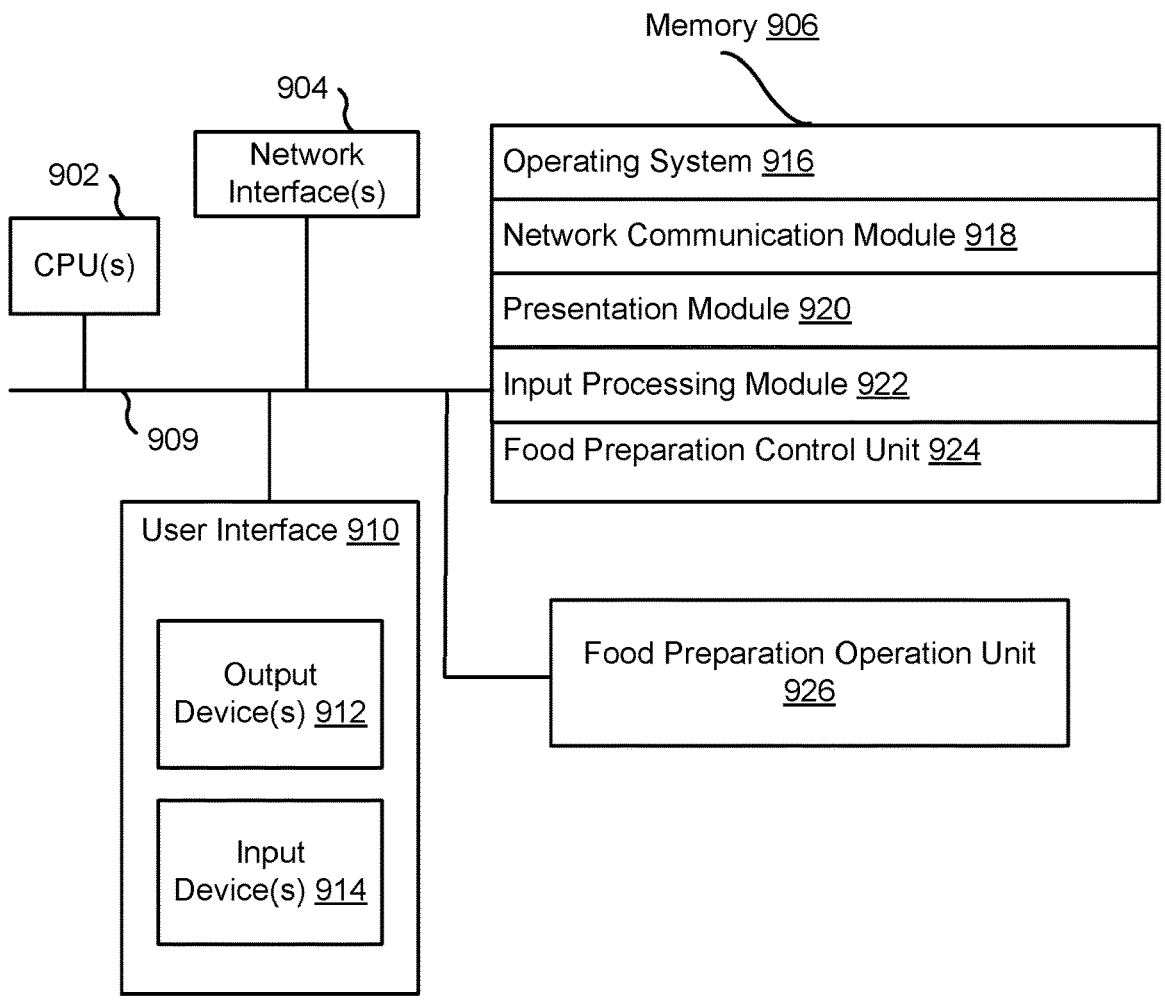
FIG. 9 is a block diagram of an exemplary cooking appliance in accordance with some embodiments.

FIG. 9 is a block diagram of an exemplary cooking appliance 900 in accordance with some embodiments. The cooking appliance 900 can serve as appliance 18, 112, 114, 140, 140', 200, 201, 202, 203, 204, for example, in various embodiments. The cooking appliance 800 includes one or more processing units (CPUs) 902, one or more network interfaces 904, memory 906, and one or more communication buses 908 for interconnecting these components (sometimes called a chipset). Cooking appliance 900 also includes a user interface 910. User interface 910 includes one or more output devices 912 that enable presentation of media content, including one or more speakers and/or one or more visual displays. User interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. In some embodiments, cooking appliance 900 further includes sensors (e.g., sensors 141, 142), which senses operating environment information of the cooking appliance 900. Sensors include but are not limited to one or more heat sensors, light sensors, one or more cameras, humidity sensors, one or more motion sensors, one or more biological sensors (e.g., a galvanic skin resistance sensor, a pulse oximeter, and the like), weight sensors, spectrometers, and other sensors. Furthermore, the cooking appliance 900 includes food preparation operation unit 926 (e.g., heating means that are based on electricity, induction, gas, radiation, etc.). Memory 906 includes non-volatile memory, such as one or more magnetic disk storage devices, one or more optical disk storage devices, one or more flash memory devices, or one or more other non-volatile solid state storage devices. Memory 906, optionally, includes one or more storage devices remotely located from one or more processing units 902. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

operating system 916 including procedures for handling various basic system services and for performing hardware dependent tasks;
  network communication module 918 for connecting to external services via one or more network interfaces 904 (wired or wireless);
  presentation module 920 for enabling presentation of information;
  input processing module 922 for detecting one or more user inputs or interactions from one of the one or more input devices 914 and interpreting the detected input or interaction;
  food preparation control unit 924, which controls the cooking appliance 900, including but not limited to modules of appliance 140 or 140' as forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 906, optionally, stores a subset of the modules and data structures identified above. Furthermore, memory 806, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method, comprising:
    at an oven including a control unit, a display, and a cooking chamber, wherein the cooking chamber includes a first camera that includes a first array of thermal image sensors corresponding to a first resolution, a second camera that includes a second array of color image sensors corresponding to a second resolution higher than the first resolution, one or more heating elements, and a food support platform:
        in accordance with instructions provided by the control unit, concurrently capturing a first image using the first camera and a second image using the second camera, wherein each of the first image and the second image includes respective sets of pixels corresponding to one or more food items placed on the food support platform, wherein the first image is of the first resolution and captured from a first perspective relative to the one or more food items, and wherein the second image is of the second resolution and captured from a second perspective distinct from the first perspective relative to the one or more food items;
        rectifying the first image by using a difference between camera parameters for the first camera and camera parameters for the second camera, wherein the rectified first image is of the second resolution and from the second perspective relative to the one or more food items;
        identifying respective sets of pixels in the rectified first image that correspond to each of the one or more food items captured in the second image, including:
            performing instance segmentation on the rectified first image and the second image to identify one or more instances of the food items on the rectified first image and the second image, respectively; and
            performing edge detection on the identified instances of food items on the rectified first image and the second image to generate a first edge map and a second edge map, respectively; and
        in accordance with established calibration rules, establishing correlations between pixels of the second image to respective sets of pixels corresponding to the one or more food items identified in the first image, wherein the established calibration rules associate the first perspective to the second perspective and the first resolution to the second resolution; and
        generating a temperature map for the one or more food items with the second resolution in accordance with a correspondence between the pixels of the second image to the respective sets of pixels corresponding to the one or more food items identified in the first image, wherein the temperature map indicates temperature distribution on the one or more food items.

2. The method of claim 1, wherein the method further comprises displaying the temperature map on the display as a new image.

3. The method of claim 1, wherein generating the first edge map or the second edge map comprises using a Canny edge detector to identify edges in the rectified first image and the second image.

4. The method of claim 1, wherein camera parameters for the first camera and cameras parameters for the second camera are obtained and stored during a camera calibration process, and the camera calibration process comprises capturing a series of calibration images of a reference object placed on the food support platform by the first camera and the second camera.

5. The method of claim 1, wherein the camera parameters for the first camera and the camera parameters for the second camera each comprises camera focal length, camera optical center, camera skew coefficients, camera position, camera field of view direction, and lens distortion factors.

6. The method of claim 1, wherein rectifying the second image to be from the first perspective comprises transforming the second image using calibration coefficients indicative of a spatial difference between the first perspective and the second perspective.

7. An oven, comprising:
    a control unit comprising one or more processors and memory storing instructions;
    a display; and
    a cooking chamber, wherein the cooking chamber includes a first camera that includes a first array of thermal image sensors corresponding to a first resolution, a second camera that includes a second array of color image sensors corresponding to a second resolution higher than the first resolution, one or more heating elements, and a food support platform, and wherein the instructions, when executed by the one or more processors, cause the processors to perform operations comprising:

in accordance with instructions provided by the control unit, concurrently capturing a first image using the first camera and a second image using the second camera, wherein each of the first image and the second image includes respective sets of pixels corresponding to one or more food items placed on the food support platform, wherein the first image is of the first resolution and captured from a first perspective relative to the one or more food items, and wherein the second image is of the second resolution and captured from a second perspective distinct from the first perspective relative to the one or more food items;

rectifying the first image by using a difference between camera parameters for the first camera and camera parameters for the second camera, wherein the rectified first image is of the second resolution and from the second perspective relative to the one or more food items;

identifying respective sets of pixels in the rectified first image that correspond to each of the one or more food items captured in the second image, including:

performing instance segmentation on the rectified first image and the second image to identify one or more instances of the food items on the rectified first image and the second image, respectively; and performing edge detection on the identified instances of food items on the rectified first image and the second image to generate a first edge map and a second edge map, respectively; and in accordance with established calibration rules, establishing correlations between pixels of the second image to respective sets of pixels corresponding to the one or more food items identified in the first image, wherein the established calibration rules associate the first perspective to the second perspective and the first resolution to the second resolution; and generating a temperature map for the one or more food items with the second resolution in accordance with a correspondence between the pixels of the second image to the respective sets of pixels corresponding to the one or more food items identified in the first image, wherein the temperature map indicates temperature distribution on the one or more food items.

8. The oven of claim 7, wherein the operations include displaying the temperature map on the display as a new image.

9. The oven of claim 7, wherein generating the first edge map or the second edge map comprises using a Canny edge detector to identify edges in the rectified first image and the second image.

10. The oven of claim 7, wherein camera parameters for the first camera and cameras parameters for the second camera are obtained and stored during a camera calibration process, and the camera calibration process comprises capturing a series of calibration images of a reference object placed on the food support platform by the first camera and the second camera.

11. The oven of claim 7, wherein the camera parameters for the first camera and the camera parameters for the second camera each comprises camera focal length, camera optical center, camera skew coefficients, camera position, camera field of view direction, and lens distortion factors.

12. The oven of claim 7, wherein rectifying the second image to be from the first perspective comprises transforming the second image using calibration coefficients indicative of a spatial difference between the first perspective and the second perspective.

13. A non-transitory computer-readable storage medium storing instructions, the instructions, when executed by one or more processors of an oven, causes the processors to perform operations, wherein:

the oven includes a display and a cooking chamber, the cooking chamber includes a first camera that includes a first array of thermal image sensors corresponding to a first resolution, a second camera that includes a second array of color image sensors corresponding to a second resolution higher than the first resolution, one or more heating elements, and a food support platform, and the operations include:

in accordance with instructions provided by a control unit, concurrently capturing a first image using the first camera and a second image using the second camera, wherein each of the first image and the second image includes respective sets of pixels corresponding to one or more food items placed on the food support platform, wherein the first image is of the first resolution and captured from a first perspective relative to the one or more food items, and wherein the second image is of the second resolution and captured from a second perspective distinct from the first perspective relative to the one or more food items;

rectifying the first image by using a difference between camera parameters for the first camera and camera parameters for the second camera, wherein the rectified first image is of the second resolution and from the second perspective relative to the one or more food items;

identifying respective sets of pixels in the rectified first image that correspond to each of the one or more food items captured in the second image, including:

performing instance segmentation on the rectified first image and the second image to identify one or more instances of the food items on the rectified first image and the second image, respectively; and performing edge detection on the identified instances of food items on the rectified first image and the second image to generate a first edge map and a second edge map, respectively; and in accordance with established calibration rules, establishing correlations between pixels of the second image to respective sets of pixels corresponding to the one or more food items identified in the first image, wherein the established calibration rules associate the first perspective to the second perspective and the first resolution to the second resolution; and generating a temperature map for the one or more food items with the second resolution in accordance with a correspondence between the pixels of the second image to the respective sets of pixels corresponding to the one or more food items identified in the first image, wherein the temperature map indicates temperature distribution on the one or more food items.

14. The computer-readable storage medium of claim 13, wherein the operations include displaying the temperature map on the display as a new image.

15. The computer-readable storage medium of claim 13, wherein generating the first edge map or the second edge map comprises using a Canny edge detector to identify edges in the rectified first image and the second image.

16. The computer-readable storage medium of claim 13, wherein camera parameters for the first camera and cameras parameters for the second camera are obtained and stored during a camera calibration process, and the camera calibration process comprises capturing a series of calibration images of a reference object placed on the food support platform by the first camera and the second camera.

17. The computer-readable storage medium of claim 13, wherein the camera parameters for the first camera and the camera parameters for the second camera each comprises camera focal length, camera optical center, camera skew coefficients, camera position, camera field of view direction, and lens distortion factors.

\* \* \* \* \*